Jan. 8, 1952      L. F. KATTER      2,581,671
ROD HOLDER

Filed Nov. 15, 1945      2 SHEETS—SHEET 1

Inventor:
Lincoln F. Katter.
By Chas. C. Reyf
Attorney.

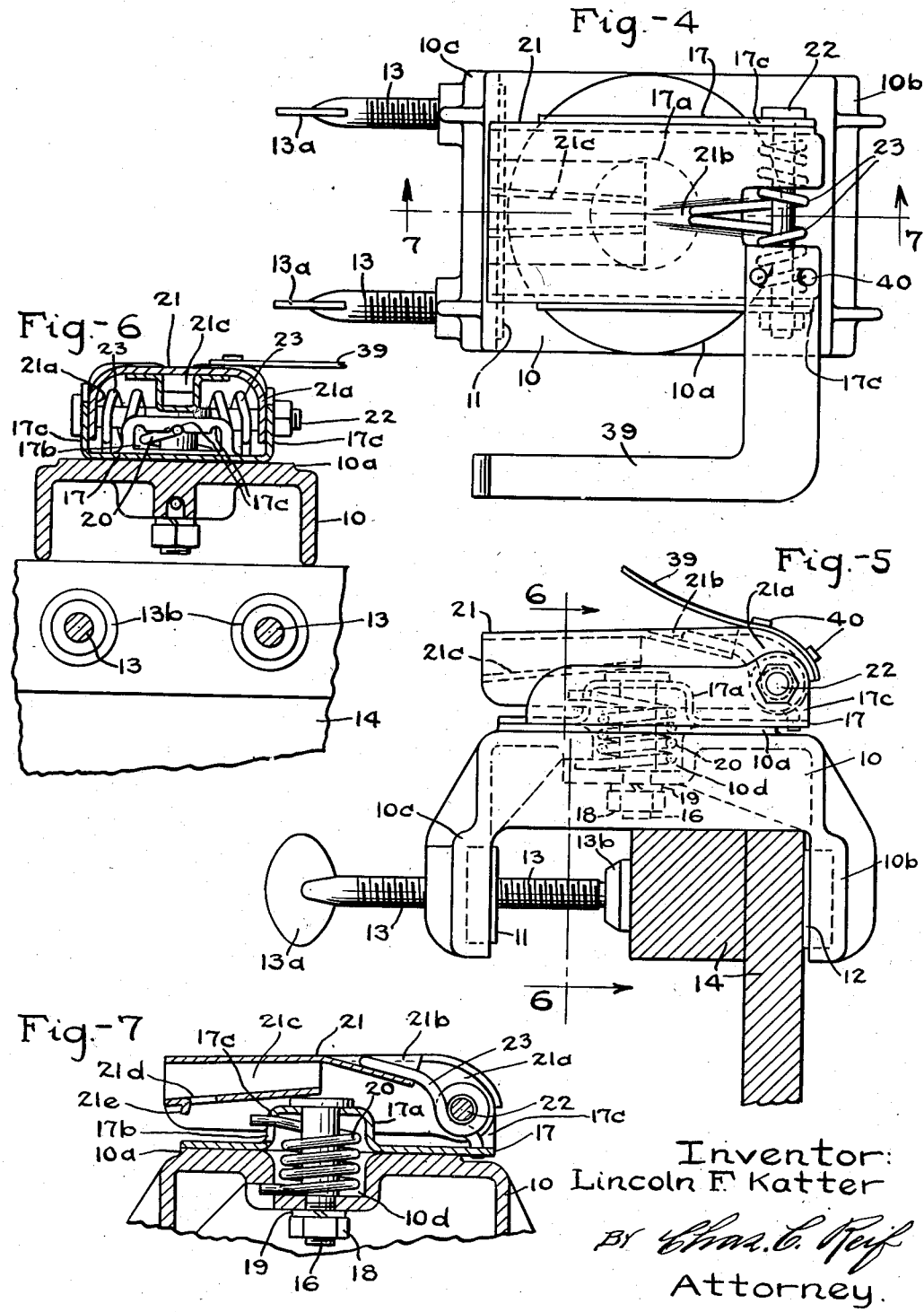

Patented Jan. 8, 1952

2,581,671

UNITED STATES PATENT OFFICE 2,581,671

ROD HOLDER

Lincoln F. Katter, Minneapolis, Minn.

Application November 15, 1945, Serial No. 628,766

13 Claims. (Cl. 248—42)

This invention relates to a device for holding a fishing rod. It is a common practice for fishermen to fish from a boat and fishermen also often fish from a wharf, dock or other fishing structure.

It is an object of this invention to provide means adapted to be connected to a fixed support such as a side of a boat, which means is constructed and arranged to detachably hold a fishing rod, which rod can be easily placed therein and can be easily and quickly removed by the operator.

It is a further object of the invention to provide a device comprising a member constructed and arranged to be secured to a fixed support such as a boat, said member having attaching means thereon, a second member adapted to carry a fishing rod having an attaching means cooperating with said attaching means to hold said members in connected relation, said second member comprising means for releasing and disconnecting said members which can be simultaneously operated by the hand of the operator grasping said fishing rod.

It is still another object of the invention to provide such a device as set forth in the preceding paragraph, together with resilient means for holding said second member and rod in a definite position circumferentially but permitting said rod to be moved circumferentially against the tension of said resilient means.

It is also an object of the invention to provide such a device as set forth in the preceding paragraph save one, together with means permitting said second member and rod to move about a substantially horizontal axis, together with resilient means for holding the same normally in one position.

It is another object of the invention to provide a holding device for a fishing rod comprising a member adapted to be secured to a fixed support such as a boat, a second member carrying a fishing rod adjacent the reel seat thereof and detachably connected to said first mentioned member, said first mentioned member having a snubbing means thereon adapted to be engaged by the handle of a reel secured in said reel seat when said handle moves in an unwinding direction.

It is more specifically an object of the invention to provide a device for holding a fishing rod comprising a member adapted to be secured to a fixed support such as the side of a boat, said member comprising an attaching means, a second member adapted to receive and hold a fishing rod adjacent the grip handle thereof, said second member having an attaching means cooperating with said attaching means to connect said members, said second member having a guard-forming casing with an opening extending transversely therethrough, a lever pivoted in said casing and having a trigger portion disposed in said opening, said lever having a latch thereon for retaining said members in connected relation, and a spring engaging said lever whereby the operator can grasp said grip handle with one hand and simultaneously operate said trigger with a finger of said hand to release said latch.

These and other objects and advantages of the invention will be fully set forth in the following description made in connection with the accompanying drawings in which like reference characters refer to similar parts throughout the several views and in which:

Fig. 4 is a top plan view of a portion of the device;

Fig. 5 is a view in side elevation of the parts shown in Fig. 4, a portion of a support being shown in vertical section;

Fig. 6 is a vertical section taken on line 6—6 of Fig. 5, as indicated by the arrows; and Fig. 7 is a vertical section taken on line 7—7 of Fig. 4, as indicated by the arrows.

Figure 1:
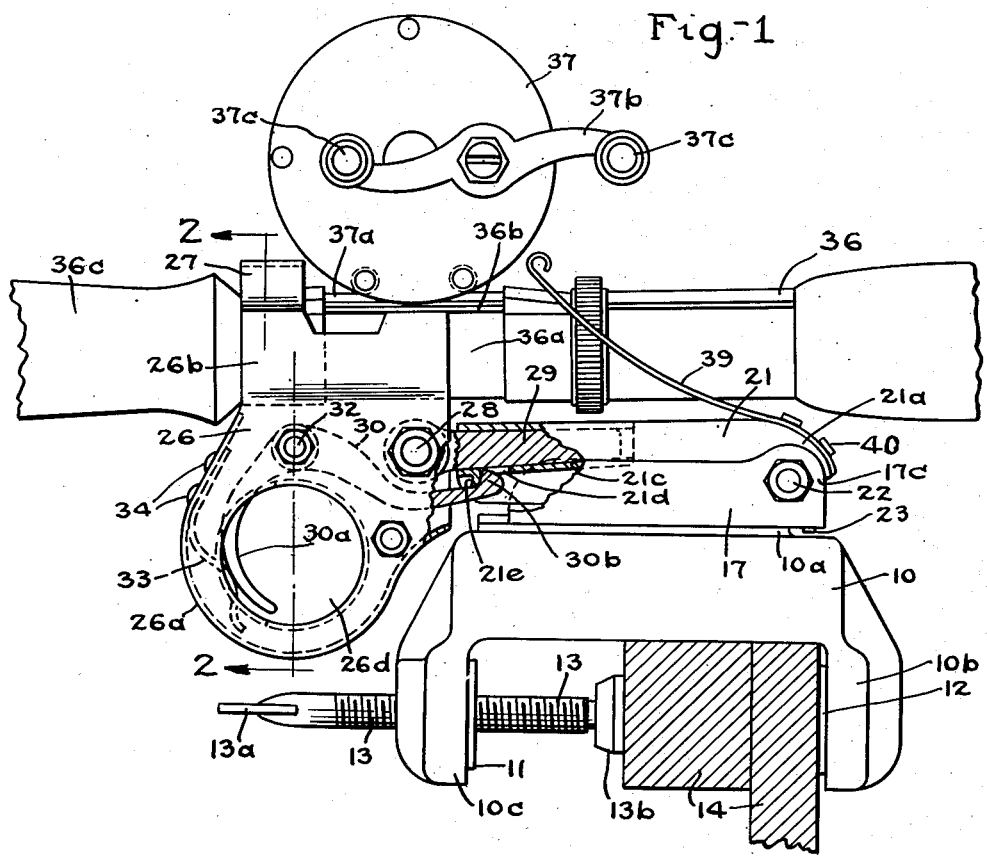
Fig. 1 is a view in side elevation of the device, some parts being broken away, others being shown in vertical section, and said device being shown as attached to a support also shown in vertical section.

Referring to the drawings, a device for holding a fishing rod is shown comprising a member 10 having a boss 10a at its top with a substantially flat top surface, said member being shown as of substantially rectangular form below said boss and as having spaced opposed depending portions 10b and 10c. Member 10, as indicated in Fig. 5, is partly of hollow construction and portions 10c and 10b are recessed to receive members or blocks 11 and 12 made of hard metal such as steel. Member 10 will preferably be made as an aluminum casting and it is desired to have a harder metal for members 11 and 12. Screws 13 are threaded through portion 10c and plate 11, the same being provided with flat handle portions 13a. Screws 13 also have head or clamping portions 13b at their other ends, which portions may have some oscillating movement relative to screws 13. The screws 13, as shown in Figs. 1 and 5, are adapted to be operated to clamp a fixed support 14, such as the side of a boat, between member 12 and the heads 13b to firmly secure member 10 to said support. A flat headed screw 16 extends through a central boss at the upper portion of member 10, which boss has a recess 10d therein. The head of said screw 16 engages the top of an upwardly pressed boss 17a on a member 17 and said screw is equipped with a nut 18 and a spring locking washer 19. Screw 16 therefore functions to connect member 17 to member 10 and member 17 has a lower flat surface engaging the top of boss 10a. A coiled torsion spring 20 surrounds screw 16, the same being disposed partly in recess 10d and partly in boss 17a, and said spring has one end extending through an opening 17b in one side of boss 17a. The top of opening 17b, as shown in Fig. 6, is provided with a plurality of notches 17c, any one of which is arranged to receive the said projecting end of spring 20. The other end of spring 20 is disposed in an opening in the boss of member 10 adjacent the bottom of recess 10d. Spring 20 thus acts to hold member 17 in one position circumferentially but member 17 can be moved circumferentially in either direction against the tension of spring 20. Member 17 has vertical extending side portions 17c within which are disposed the downwardly extending side portions 21a of a member 21. A headed and nutted bolt 22 extends through portions 17c and 21a adjacent one end thereof, and a pair of coiled torsion springs 23 surround bolt 22, said springs having their adjacent ends projecting into a recess or opening 21b formed centrally in the top of member 21. The remote ends of springs 23 are secured in openings in the bottom of member 17, as shown in Fig. 5. With the described construction it will be seen that member 21 could be raised or moved about bolt 22 against the tension of springs 23. Member 21 has a recess or socket 21c formed therein at its front end, the same having an opening 21d through its lower side, said side having a short down-turned lip 21e at the front side of said opening. Socket 21c is of rectangular form in cross section.

Figures 2, 3:
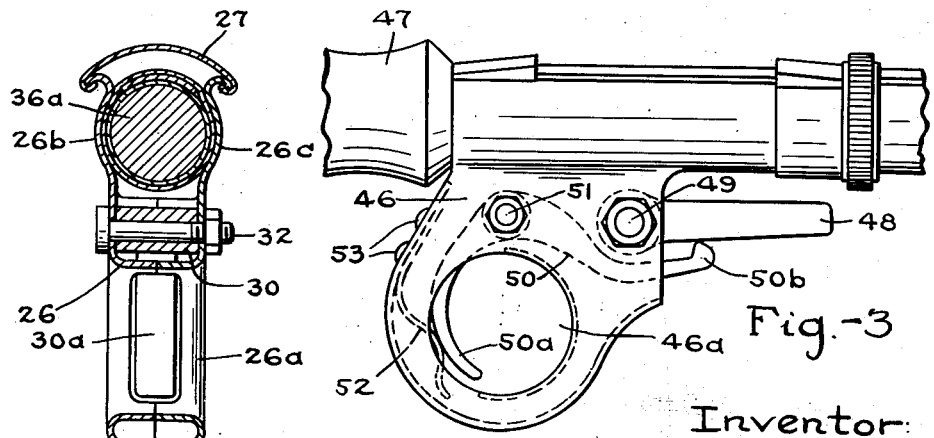
Fig. 2 is a vertical section taken on line 2—2 of Fig. 1, as indicated by the arrows.
Fig. 3 is partial view in side elevation showing a modification.

A member 26 is provided, the same comprising a casing portion 26a and portions 26b which project upwardly in spaced relation at each side of portion 26a and portions 26b have oppositely curved portions 26c. The upper ends of portions 26b are bent or curved outwardly and the plate 27 of resilient material such as sheet metal has its ends reversely curved to engage over the ends of said out-turned portions of members 26b. Plate 27, as shown in Fig. 2, is of curved form. Casing 26 has an opening 26d extending transversely therethrough and while this might be variously formed, in the embodiment of the invention illustrated, it is shown as substantially circular. Casing 26 has secured thereto by a headed and nutted bolt 28 a projecting stem 29. Stem 29 is of rectangular form in cross section and is constructed and arranged to fit snugly in the socket 21c of member 21, as shown in Fig. 1. A lever 30 is pivotally mounted on a headed and nutted bolt 32 extending through casing 26a, one end of said lever being formed as a curved trigger 30a which is disposed largely in the opening 26d and at one side of said opening. A plate spring 33 is secured to one side of casing 26a by the rivets 34, said spring being bent and disposed so as to engage one side of trigger 30a. The other end of lever 30 projects through one side of casing 26a and is formed at its end as a latch 30b which engages the portion 21e and is disposed somewhat in opening 21d.

The portions 26b are adapted to receive therebetween and to hold therein a portion 36a of a fishing rod 36. Said portion 36a of said rod is closely adjacent the reel seat 36b of the rod, which will be of the usual construction and adapted to hold the base plate 37a of a fishing reel 37 having the usual rotatable handle 37b with the projecting portions 37c adapted to be engaged by the fingers of the operator. The portions 26b are also closely adjacent the grip handle 36c of the rod 36. Spring 39 is secured to the top and rear end of member 21 by any suitable means, as by rivets 40, and said spring extends laterally, as shown in Fig. 4, and then forwardly, and has its end reversely curved, as shown in Fig. 1.

In operation the member 10 will be clamped on the support 14, which may be the side of a boat. This can readily be done by turning screws 13 and clamping the side of the boat between heads 13b and plate 12. The fishing rod 36 will be inserted in member 26 and plate 27 will be pressed into place. The operator will now insert the stem 29 into the socket 21c. When this is done, latch 30b will engage the projection 21e and the stem 29 will be locked in the socket 21c so that members 26 and 10 are now securely connected. The rod 36 will now be supported in members 10 and 26 and can be so left by the fisherman or operator. Should a fish strike and be hooked so that a pull is exerted on the fishing line and rod 36, the rod can be pulled circumferentially in either direction against the tension of spring 20. There is thus a yielding effect present so that the rod would not be broken. The rod can also be pulled downwardly and in this case member 21 will swing against the tension of the springs 23. Should the fisherman leave the line in condition so that it can be pulled out by the fish and thus turn the reel 37 in an unwinding direction, the handles 37c will strike against the end of the snubbing spring 39 and prevent a too rapid movement of the line. Usually as soon as a fish strikes, which will be indicated by a pull on the line and a change in position of the rod, the fisherman will grasp the grip handle 36c with one hand and with the forefinger of the same hand will press trigger 30a, thus moving lever 30 and releasing latch 30b. Member 26 can now be quickly separated from member 10 by merely withdrawing stem 29 and the fisherman can handle the rod and play the fish as usual just as if he had only the rod in hand. He can manipulate the rod as long as desired with the member 26 still attached thereto, and when he wishes to again set the rod or have it supported on the boat, he will merely again push the stem 29 into socket 21c to again connect members 26 and 10. The rod can be held so as to project outwardly substantially at right angles to the side of the boat, or if more convenient it can be directed at an angle to the side of the boat. This can be done by depressing the upper end of spring 20 and disposing it in one of the side notches 17c.

In Fig. 3 a modified form of the invention is shown in which the member 46, similar to member 26, is provided, but the same is secured permanently to the bottom of the reel seat portion of the fishing rod 47. Member 46 can be connected in any suitable manner to the rod or formed as a part thereof. Member 46 has a stem 48 similar to stem 29 and secured by a headed and nutted bolt 49. A lever 50, similar in all respects to lever 30, is provided, and pivoted on the headed and nutted bolt 51, similar to bolt 32. Lever 50 has a trigger portion 50a disposed in the transverse opening 46a which extends through member or casing 46. The spring 52, shown as secured by rivets 53, is disposed in member 46 and bears on the side of trigger 50a. Lever 50 also has a latch portion 50b, identical with the latch portion 30b.

The operation of the device shown in Fig. 3 will be substantially the same as above described except that the rod 47 will not have to be pressed and latched in member 46. The operator can manipulate the rod 47 as usual, and when he wishes to connect it to member 10, he will push the stem 48 into the recess 21c and latch 50b will then engage portion 21e. The rod can be quickly disengaged, as above described, by grasping the grip handle and pulling on trigger 50a by a finger of the same hand. The pull upon the rod by a striking fish and the movement of the rod against the retaining springs can also take place during trolling.

From the above description it will be seen that I have provided a comparatively simple and simple and highly efficient rod carrier or rod-holding device. In the form shown in Figs. 1 and 2 the rod can be easily and quickly placed between members 26b and 26c. These members are held in their rod-grasping or clamping position by the bolts 28 and 32. The member 27 is provided to hold members 26c and 26b in clamping position. Should a great stress be placed on the rod and some strain occur tending to move it out of members 26b and 26c, member 27 will function to hold the rod securely in place. Member 27 also acts as a cover plate. It will be obvious that the device can be made to fit various types of rods and various types of reel seats thereon. The device can be easily and quickly secured to the side or end of a boat or other support and the rod can be conveniently and quickly placed in fixed or set position. The member 10 and parts carried thereby is of a size which can be conveniently carried in the fisherman's kit. Ample provision is made for movements of the rod and the rod can be instantly released at any time and manipulated as desired to play or land a fish. When the fish strikes and the line is run out the striking of the reel handle on the spring 39 will attract the attention of the fisherman. A strike will also be indicated by a pull up on the rod and the resulting movement of the rod. This will be quickly noted by the fisherman. It will be apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A holding device for a fishing rod having in combination, a member having means thereon for attachment to a boat and having an attaching means thereon, a second member constructed and arranged to receive and hold a fishing rod and having an attaching means thereon cooperating with said attaching means to detachably connect said members, means adapted to be actuated by the hand of the operator while simultaneously grasping said rod for disconnecting said members, said attaching means comprising a recess in said first mentioned member, said second member having a portion receivable in said recess, and a latch for retaining said portion in said recess, said last mentioned means including a trigger for moving and releasing said latch.

2. A holding device for a fishing rod having in combination, a member having means thereon for attachment to a boat, a second member for receiving and holding a fishing rod adjacent the grip handle and reel seat thereon, said members having cooperating connecting means, and a snubbing means arranged to be engaged by the handle of a reel mounted in said reel seat.

3. A holding device for a fishing rod having in combination, a member having means thereon for securing the same to a fixed support such as a boat, said member having a connecting means thereon, a second member having means for receiving and holding a fishing rod adjacent the grip handle thereof, said second member having a connecting means cooperating with said first mentioned connecting means to connect said members, a latch comprising a spring-pressed lever for holding said members connected, said lever having a trigger formed thereon and arranged so that the operator can grasp said grip handle with his hand and simultaneously operate said trigger with a finger of said hand.

4. A holding device for a fishing rod having in combination, a member having means thereon for attachment to a boat, a second member for receiving and holding a fishing rod adjacent the grip handle and reel seat thereon, said members having cooperating connecting means, said second member having a guard thereon with an opening extending transversely therethrough, a spring secured to said guard, a lever having a trigger disposed in said opening and engaged by said spring, said lever having a latch constructed and arranged to hold said members in connected relation whereby said handle can be grasped by a hand of the operator, and said trigger simultaneously actuated by a finger of said hand.

5. The structure set forth in claim 3, said first mentioned member having a snubbing means thereon arranged to be engaged by the handle of a reel secured in said reel seat when said reel rotates in an unwinding direction.

6. A holding device for a fishing rod having in combination, a member having means thereon for attachment to a boat, a second member pivoted to said member about a substantially vertical axis, a spring holding said second member in one position, and a fishing rod-carrying member detachably secured to said second member whereby said rod and second member can be swung circumferentially against the tension of said spring.

7. A holding device for a fishing rod having in combination, a bracket having means thereon for attachment to a boat, a member pivoted to said bracket about a substantially vertical axis, resilient means engaging said bracket and member for holding said member in a definite position circumferentially, a second member secured to said member and movable about a substantially horizontal axis, a resilient means holding said second member normally in one position, said second member having an attaching means thereon, a third member carrying a fishing rod thereon and comprising an attaching means cooperating with said attaching means to connect said second and third members.

8. A holding device for a fishing rod having in combination, a member having resilient means for receiving and detachably holding a fishing rod adjacent its grip handle, said member having a casing having a transverse opening therethrough, a spring in said casing, a lever pivoted in said casing having a trigger portion disposed in said opening, said lever having a latch thereon, a second member having means thereon for attachment to a boat and having a recess for receiving a portion of said first mentioned member, said latch engaging said second member to hold said members in connected relation whereby said handle can be grasped by the hand of the operator and said trigger simultaneously operated by the finger of said hand to permit separation of said members.

9. A fishing rod having a handle portion, means permanently connected to and forming a part of said rod having a free projecting portion, a member resiliently held against rotation which is attachable to a boat and which has an open ended socket therein, said portion being adapted to be moved longitudinally into and fit tightly in said socket and readily releasable means for holding said means and said member in position with said portion in said socket.

10. A holding device for a fishing rod having in combination, a member having means adapted to be attached to a boat and having a portion rotatable about a vertical axis, resilient means resisting rotation of said portion in either direction, said portion having an open-ended socket therein, a second member adapted to be secured to the handle portion of a fishing rod and disposed at one side of said handle portion and having a part receivable in and fitting in said socket and a releasable latch for holding said portion in said socket.

11. A holding device for a fishing rod having in combination, a member having means thereon for attachment to a boat and being rotatable about a substantially vertical axis, resilient means resisting rotation of said member in either direction, said member having an open-ended socket therein, a second member adapted to be secured to the handle portion of a fishing rod and having a portion receivable in and fitting in said socket, said portion being disposed below and at one side of said handle portion and extending substantially parallel thereto, a spring-operated latch for connecting said members when said portion is disposed in said socket, said second member having a depending portion in the rear of said portion with an opening extending transversely therethrough and a trigger disposed in said opening for operating said latch for disconnecting said second member.

12. A holding device for a fishing rod having in combination, a member having means thereon for securing the same to a boat and having a portion above said means having an open-ended socket therein, a second member constructed and arranged to be attached to the handle portion of a fishing rod and having a portion disposed at one side of said handle portion and receivable in and fitting in said socket, latching means carried by said members for connecting the same together when said portion is placed in said socket, said second member having a second portion depending in the rear of said first mentioned portion and having a transverse opening therethrough and a trigger disposed at the rear of said opening for operating said latch, said second portion being below said handle portion of said rod whereby said handle portion can be grasped by the hand of the operator and said trigger simultaneously actuated by a finger of said hand.

13. A holding device for a fishing rod, which rod has a grip handle adjacent one end having in combination, a member having means thereon for securing the same to a fixed support such as a boat, said member having a connecting means thereon comprising a portion having an open ended socket therein, a second member attached to the said rod adjacent said grip handle portion, said second member having a connecting means cooperating with said first mentioned connecting means and comprising a projecting stem disposed below said grip handle and rod and adapted to be received in said socket, and means for holding said projection in said socket.

LINCOLN F. KATTER.

REFERENCES CITED

The following references are of record in the file of this patent:

UNITED STATES PATENTS

| Number | Name | Date |
|---|---|---|
| 1,285,218 | Kershaw | Nov. 19, 1918 |
| 1,459,438 | Brand | June 19, 1923 |
| 1,856,477 | Gerline | May 3, 1932 |
| 2,199,034 | Witczak | Apr. 30, 1940 |
| 2,238,127 | Nissen | Apr. 15, 1941 |
| 2,311,823 | Gaskill | Feb. 23, 1943 |
| 2,427,600 | Hanke | Sept. 16, 1947 |